(12) United States Patent
Imakawa et al.

(10) Patent No.: US 8,228,474 B2
(45) Date of Patent: Jul. 24, 2012

(54) LIQUID CRYSTAL DISPLAY DEVICE AND METHOD FOR MANUFACTURING THE SAME

(75) Inventors: Masanori Imakawa, Kanagawa-ken (JP); Arihiro Takeda, Saitama-ken (JP); Nobuko Fukuoka, Saitama-ken (JP)

(73) Assignee: Toshiba Mobile Display Co., Ltd., Tokyo (JP)

( * ) Notice: Subject to any disclaimer, the term of this patent is extended or adjusted under 35 U.S.C. 154(b) by 262 days.

(21) Appl. No.: 12/649,949

(22) Filed: Dec. 30, 2009

(65) Prior Publication Data

US 2010/0195037 A1 Aug. 5, 2010

(30) Foreign Application Priority Data

Feb. 4, 2009 (JP) ................. P2009-024073

(51) Int. Cl.
G02F 1/1343 (2006.01)
(52) U.S. Cl. ...................................................... 349/139
(58) Field of Classification Search .................... 349/139
See application file for complete search history.

(56) References Cited

U.S. PATENT DOCUMENTS

| 2007/0165166 A1 | 7/2007 | Kawata et al. |
| 2007/0200990 A1 | 8/2007 | Hirosawa et al. |
| 2008/0111964 A1 | 5/2008 | Shirasaka et al. |
| 2008/0192160 A1 | 8/2008 | Yoshida et al. |
| 2008/0291382 A1 | 11/2008 | Fukuoka et al. |
| 2009/0027607 A1* | 1/2009 | Kim et al. ..................... 349/155 |
| 2009/0103021 A1 | 4/2009 | Manabe et al. |

FOREIGN PATENT DOCUMENTS

JP 2008-197493 8/2008

OTHER PUBLICATIONS

U.S. Appl. No. 12/882,608, filed Sep. 15, 2010, Takeda, et al.

* cited by examiner

Primary Examiner — Timothy L Rude
(74) Attorney, Agent, or Firm — Oblon, Spivak, McClelland, Maier & Neustadt, L.L.P.

(57) ABSTRACT

A liquid crystal display device comprises an array substrate having first and second pixel electrodes arranged adjacent each other and a counter substrate having a counter electrode opposing to the first and second pixel electrodes. First and second slits are formed on the counter electrode opposing to the first and second pixel electrode so as to cross the first and second pixel electrode, respectively. The counter electrode is separated into a first counter electrode portion and a second counter electrode portion by the first and second slits. A connecting counter electrode portion is arranged between the first and second slits to connect the first and second counter electrode portions. A columnar spacer is arranged between the first and second slits opposing to the connecting counter electrode portion to form a cell gap between the array substrate and the counter substrate.

5 Claims, 6 Drawing Sheets

LIQUID CRYSTAL DISPLAY DEVICE AND METHOD FOR MANUFACTURING THE SAME

CROSS-REFERENCE TO RELATED APPLICATION

This application is based upon and claims the benefit of priority from prior Japanese Patent Application No. 2009-024073, filed Feb. 4, 2009, the entire contents of which are incorporated herein by reference.

BACKGROUND OF THE INVENTION

1. Field of the Invention

The present invention relates to a liquid crystal display device, and more particularly to a vertical alignment (VA) mode type liquid crystal display device.

2. Description of the Related Art

Liquid crystal display devices are widely used as display devices for various kinds of equipment such as personal computers, OA equipments, and TV sets because the display devices have many advantages such as lightness, compactness and low power consumption. In recent years, the liquid crystal display device has also been used in mobile terminal equipments such as a mobile phone, a car navigation device and a game player.

In order to obtain a high quality display, further characteristics such as a wide viewing angle and a high contrast ratio are requested in the liquid crystal display device. Recently, a Multi-Domain type liquid crystal display device using Multi-Domain Vertical Alignment (MVA) mode in which a pixel includes a plurality of domains, has been used. In this type liquid crystal display device, the wide viewing angle is achieved by the plurality of domains. Further, a high contrast ratio which results in more complete black display is obtained because a retardation of the liquid crystal material becomes nearly zero. The liquid crystal molecules around an alignment film are aligned in a horizontal direction with respect to a substrate by adopting a homeotropic alignment treatment.

For example, Japanese laid open patent application No. 2008-197493 discloses a semi-transmissive type LCD using MVA mode by arranging slits or protrusions in a pixel electrode or a counter electrode. In this vertical alignment type LCD, variations in a cell gap holding a liquid crystal layer causes an alignment defect of liquid crystal molecules, which may result in a poor display, such as variation in the transmissivity, coloring in a case of a white display, or luminosity unevenness.

BRIEF SUMMARY OF THE INVENTION

The present invention has been made to address the above mentioned problems. One object of this invention is to provide a vertical alignment (VA) mode type liquid crystal display device having a multi domain structure.

Thus, according to one aspect of the invention, there is provided a liquid crystal display device including: an array substrate having first and second pixel electrodes arranged adjacent each other; a counter substrate having a counter electrode opposing to the first and second pixel electrodes; a first slit formed in the counter electrode opposing to the first pixel electrode so as to cross the first pixel electrode; a second slit formed in the counter electrode opposing to the second pixel so as to cross the second pixel electrode, the second slit being arranged in line with the first slit, and the counter electrode being separated into a first counter electrode portion and a second counter electrode portion by the lined first and second slits; a connecting counter electrode portion arranged between the first and second slits to connect the first and second counter electrode portions; a columnar spacer arranged between the first and second slits opposing to the connecting counter electrode portion to form a cell gap between the array substrate and the counter substrate; and a liquid crystal layer formed in the cell gap.

According to another aspect of the invention, there is provided a method for manufacturing a liquid crystal display comprising: providing an array substrate having first and second pixel electrodes arranged adjacent each other; providing a counter substrate having a counter electrode opposing to the first and second pixel electrodes; forming a first slit in the counter electrode opposing to the first pixel electrode so as to cross the first pixel electrode; forming a second slit in the counter electrode opposing to the second pixel so as to cross the first pixel electrode, the second slit being arranged in line with the first slit, and the counter electrode being separated into a first counter electrode portion and a second counter electrode portion by the lined first and second slits; providing a connecting counter electrode portion arranged between the first and second slits to connect the first and second counter electrode portions; forming a columnar spacer on either one of the array substrate and the counter substrate arranged between the first and second slits opposing to the connecting counter electrode portion to form a cell gap between the array substrate and the counter substrate; forming a seal element in a loop shape on either one of the array substrate and the counter substrate; dropping a predetermined amount of a liquid crystal material in a region surrounded by the seal element; attaching the array substrate and the counter substrate in a state of vacuum, and returning the attached array substrate and the counter substrate to an atmospheric pressure state from the vacuum state.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display device according to an exemplary embodiment of the present invention will now be described with reference to the accompanying drawings wherein the same or like reference numerals designate the same or corresponding parts throughout the several views.

Figure 1:
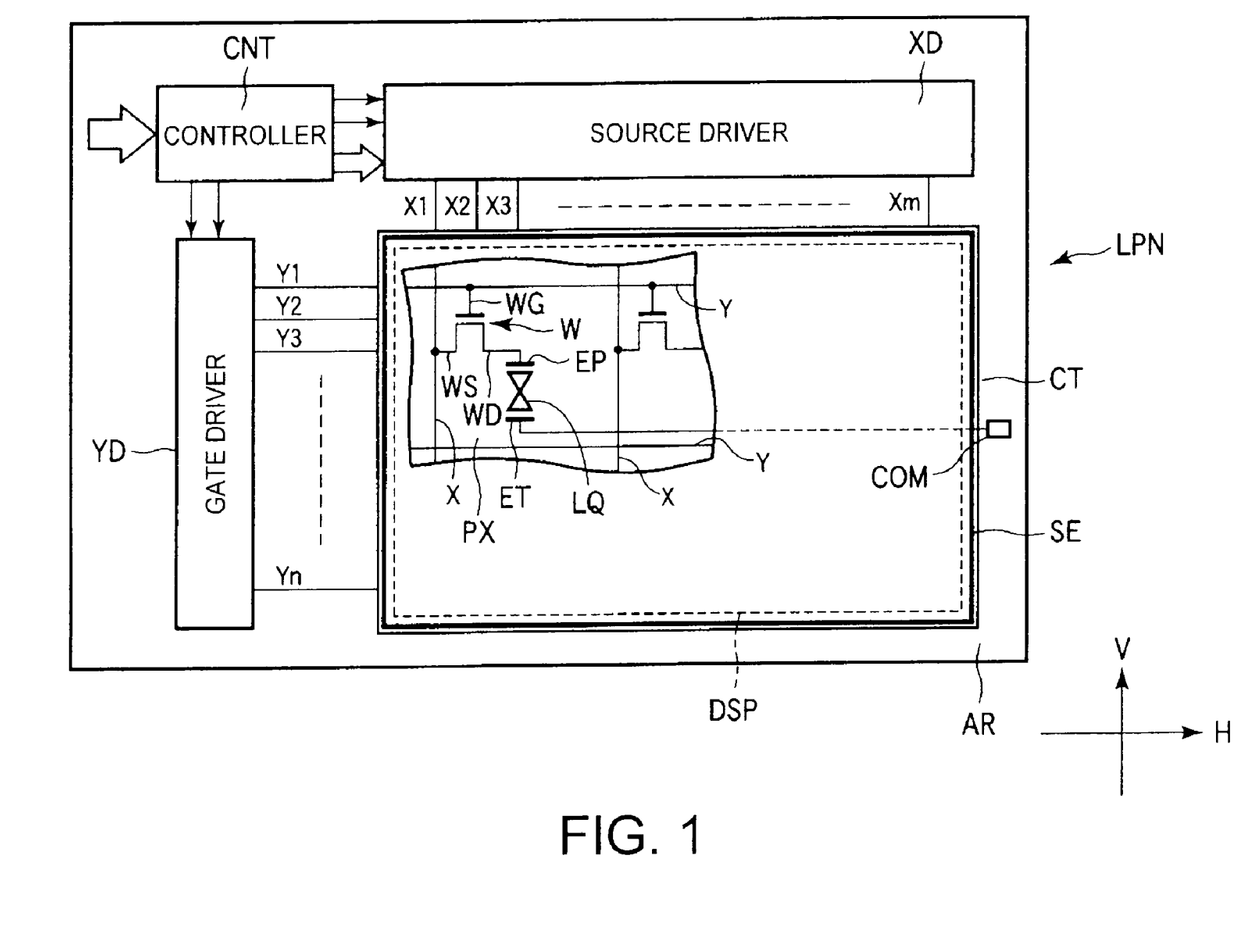
FIG. 1 is a schematic block diagram showing a liquid crystal display device using a MVA mode according to an embodiment according to the present invention.
Figure 2:
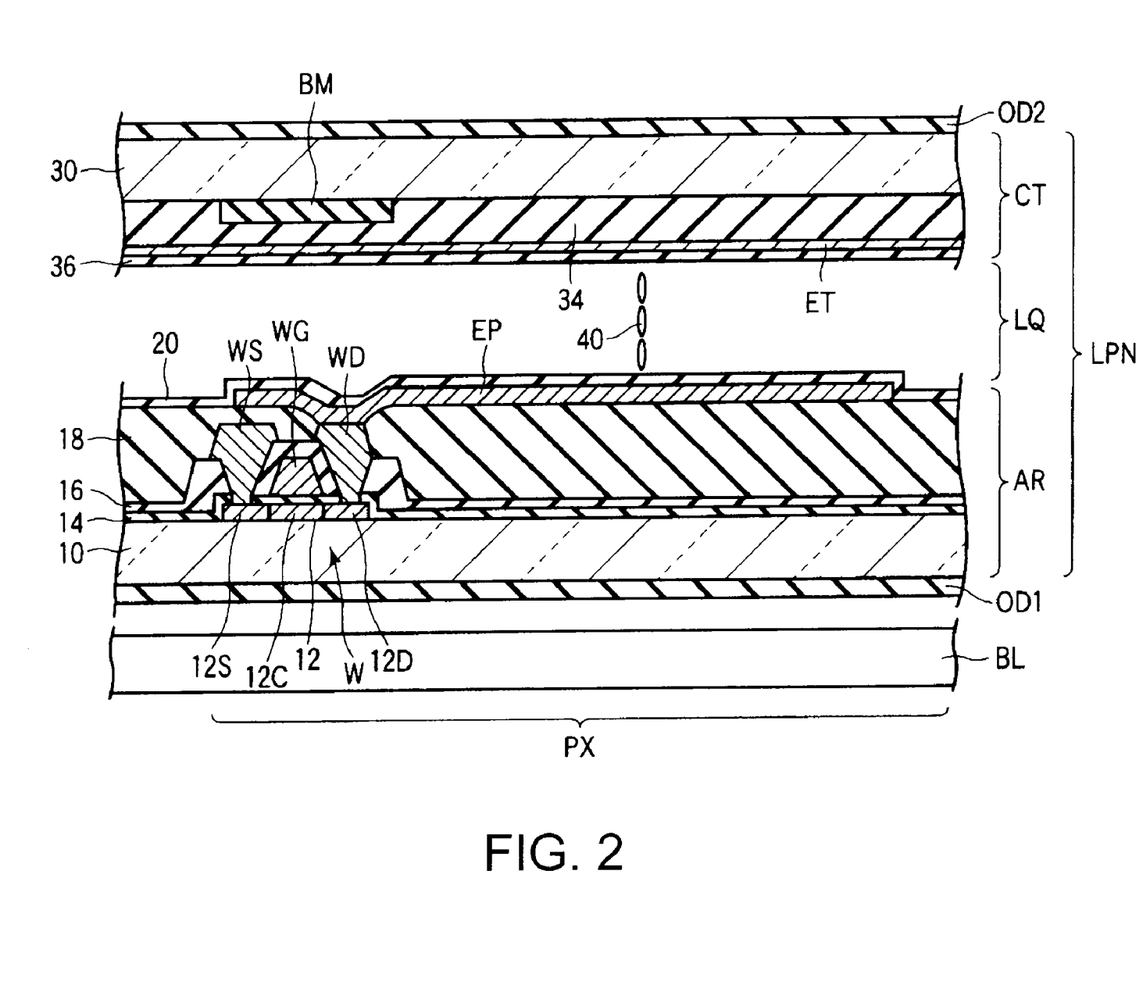
FIG. 2 is a cross-sectional view of an array substrate and a counter substrate used in the liquid crystal display device shown in FIG. 1.

FIG. 1 and FIG. 2 show an active matrix type liquid crystal display device of transmissive mode according to an embodiment of the invention, in which pictures are displayed by selectively transmitting light from a backlight unit through a pixel. Of course, the present invention is also applicable to a reflective type liquid crystal display device.

The liquid crystal display device includes an active matrix type liquid crystal display panel LPN. The liquid crystal display panel LPN includes a pair of electrode substrates, which are an array substrate (first substrate) AR and a counter-substrate (second substrate) CT opposing each other and attached by a seal element SE so as to hold a liquid crystal layer LQ which functions as a light modulation layer. The liquid crystal display panel LPN includes an approximately rectangular active area DSP to display pictures. The active area DSP consists of (m×n) pixels PX arranged in a matrix.

The array substrate AR includes (m×n) picture electrodes EP arranged in the respective pixels PX in the active area DSP, n gate lines (Y1~Yn) which extend in a row direction H of the pixels PX, m source lines (X1~Xm) which extend in a column direction V of the pixels PX orthogonally crossing the row direction H, (m×n) switching transistors W which are disposed near the intersections of the gate lines Y and the source lines X.

The gate line Y and source line X are, for example, formed of highly conductive materials such as aluminum, molybdenum, tungsten or titanium. The respective switching transistors W are formed of, for example, n channel type Thin Film Transistors (TFTs). The gate electrode WG of the switching transistor W is connected to the gate line Y or integrally formed of the gate line Y. The source electrode WS of the switching transistor W is connected to the source line X. The drain electrode WD of the switching transistor W is connected to the pixel electrode EP. The pixel electrode EP is, for example, formed of conductive material having a light transmissive characteristic, such as Indium Ting Oxide (ITO) or Indium Zinc Oxide (IZO).

Respective n gate lines Y are retrieved to outside of the active area DSP and connected to a gate driver YD. Respective m source lines X are retrieved to outside of the active area DSP and connected to a source driver XD. The gate driver YD sequentially supplies scan signals (driving signals) to the n gate lines Y controlled by a controller CNT. The source driver XD supplies image signals (driving signals) to the m source lines (X1~Xm) controlled by the controller CNT. On the other hand, the counter substrate CT includes a counter electrode ET in the active area DSP. The counter electrode ET is formed of transmissive conductive materials such as ITO or IZO. The counter electrode ET is commonly used for the plurality of pixels PX. That is, the counter electrode ET opposes to the pixel electrodes EP of the respective pixels PX and electrically connected to a common potential terminal COM.

As shown in FIG. 2, the array substrate AR is formed of a transmissive insulating substrate 10 such as a glass substrate or a silicate glass substrate. The switching transistor W and the pixel electrode EP are arranged on a surface of the array substrate AR so as to oppose to the counter substrate CT.

The switching transistor W includes a semiconductor layer 12 formed on the insulating substrate 10. The semiconductor layer 12 may be formed of poly-silicon or amorphous silicon. In this embodiment, poly-silicon is used. The semiconductor layer 12 includes a drain region 12D and a source region 12S with an interposed channel region 12C. The semiconductor layer 12 is covered with a gate insulating layer 14.

The gate electrode WG of the switching transistor W is arranged on a channel region 12C in the semiconductor layer 12 interposing a gate insulating layer 14. The gate electrode WG is, for example, may be formed of the same material as the gate line Y using the same process and covered with an interlayer insulation film 16 with the gate line Y. The gate insulating layer 14 and the interlayer insulation film 16 are, for example, formed of a non-organic material such as silicon oxide or silicon nitride.

The source electrode WS and the drain electrode WD of the switching transistor W are arranged on the interlayer insulation film 16. The source electrode WS contacts with the source region 12S in the semiconductor layer 12 through a contact hole which penetrates the gate insulating layer 14 and the interlayer insulation film 16. The drain electrode WD contacts with the drain region 12D in the semiconductor layer 12 through a contact hole which penetrates the gate insulating layer 14 and the interlayer insulation film 16. The source electrode WS and the drain electrode WD of the switching transistor W may be formed using the same material and the same process and covered with an insulating layer 18 with the source line.

The insulating layer 18 is formed of a transmissive organic material. The insulating material 18 is, for example, formed by conducting cure treatment after being applied by the technique of a spin coat. According to this method, the insulating layer 18 makes the surface of the base layer smoothen, which results in suppression of bad influence caused by the surface concavity and convexity to realize the vertical alignment mode.

The pixel electrode EP is arranged on the insulating layer 18. The pixel electrode EP is connected to the drain electrode WD through a contact hole formed on the insulating substrate 18. The surface of the array substrate AR contacting with the liquid crystal layer LQ is covered with a first alignment film 20. That is, the first alignment film 20 is arranged on the pixel electrode EP and the insulating layer 18.

On the other hand, the counter substrate CT is formed of a transmissive insulating substrate 30 such as a glass substrate or a silicate substrate. The counter electrode ET is formed on a main surface of the insulating substrate 30 so as to oppose to the array substrate AR. The counter substrate CT includes a black matrix BM made by a shield material such as a black colored resin or chromium. The black matrix BM is arranged on the insulating substrate 30 and opposes to the switching transistor W and the wiring layers such as gate lines Y and source lines X.

In the color type liquid crystal display, a color filter layer 34 is formed on the surface of the counter substrate CT corresponding to each pixel PX as shown in FIG. 2. The color filter layer 34 is formed of resin materials which are colored in a plurality of colors, for example, in the three primary colors of red (R), green (G) and blue (B). The red color resin, green color resin and blue color resin are disposed in association with a red pixel, a green pixel and a blue pixel, respectively. The color filter layer 34 may be disposed on the array substrate AR while the color filter layer 34 is formed on the counter substrate CT in FIG. 2. In this case, the insulating layer 18 may be replaced by the color filter layer 34.

An overcoat layer may be arranged between the color filter layer 34 and the counter electrode ET so as to smoothen the irregular surface of the color filter layer 34. The counter electrode ET is arranged on the color filter layer 34 or the overcoat layer and opposes to the pixel electrodes EP. The surface of the counter substrate CT which contacts with the liquid crystal layer LQ is covered with a second alignment film 36. That is, a second alignment film 36 is arranged on the counter electrode ET.

The array substrate AR and the counter substrate CT are arranged so that the first alignment film 20 and the second alignment film 36 oppose each other. A spacer, for example, a columnar spacer made of resin that is integrally formed with either one of the counter substrate CT and the array substrate AR, is provided to maintain a predetermined gap between the substrates. The substrates are attached by a seal element SE to maintain the gap therebetween.

The liquid crystal layer LQ is formed by injecting liquid crystal material consisting of liquid crystal molecules with a negative dielectric constant anisotropy into the gap formed between the first alignment film 20 on the array substrate AR and the second alignment film 36 on the counter substrate CT.

The first alignment film 20 and the second alignment film 36 work to align the liquid crystal molecules 40 in a vertical direction with respect to the array substrate AR and the counter substrate CT when a voltage is not applied, that is, an electrical field is not formed between the picture electrode EP and the counter electrode ET. A thin film with a vertical alignment characteristic and an optically transmissive characteristic is used to form the first and the second alignment films 20 and 36.

An alignment process represented by rubbing is not needed in the first and second alignment films 20 and 36 in this embodiment. For this reason, problems such as generation of static electricity and dusts are not caused in the rubbing process, and a washing process is not required after the alignment treatment. Furthermore, there is no problem of the display unevenness by the variation in the pretilt. Accordingly, a low cost is achieved by simplifying the process and raising a manufacturing yield.

As shown in FIG. 2, a back light to illuminate the liquid crystal display panel LPN is arranged opposing to the array substrate AR. Various back lights may be adopted, for example, using light emitting diodes (LEDs) or a cold cathode-tube as a light source.

A first optical element OD1 is arranged one of the surfaces of the liquid crystal display panel LPN, that is, the surface of the array substrate AR opposing to the back light. Similarly, a second optical element OD2 is arranged on the other surface of the liquid crystal display panel LPN. Each of the first and second optical elements OD1 and OD2 include a polarizer which is arranged so that each of the absorption axes crosses orthogonally. The first and second optical elements OD1 and OD2 may include retardation films which supply appropriate retardation to passing light.

According to this embodiment, a long axis of the liquid crystal molecules 40 is aligned in the vertical direction (e.g. in the normal line direction of the liquid crystal display panel LPN) when an electric field is not applied to the liquid crystal molecules 40. Under such condition, the light from the backlight unit is absorbed in the second optical element OD2 after passing the first optical element OD1 and the liquid crystal layer LQ. As a consequence, the transmission factor becomes lowest, that is, a black picture is displayed.

On the other hand, when an electric field is applied between the picture electrode EP and the counter electrode ET, the liquid crystal molecules 40 with a negative dielectric constant anisotropy are aligned in the orthogonal direction with respect to the electric field. The long axis of the liquid crystal molecules 40 are aligned approximately in a parallel direction or at a tilt with respect to the surface of the substrates. Under such condition, after the light from the backlight unit has passed the first optical element OD1, appropriate retardation is given to the light when the light passes the liquid crystal layer LQ. As a consequence, partial light from the backlight unit becomes possible to pass in the second optical element OD2 and a white picture is displayed. Accordingly, a vertical align mode with a normally black mode is achieved.

Figure 3:
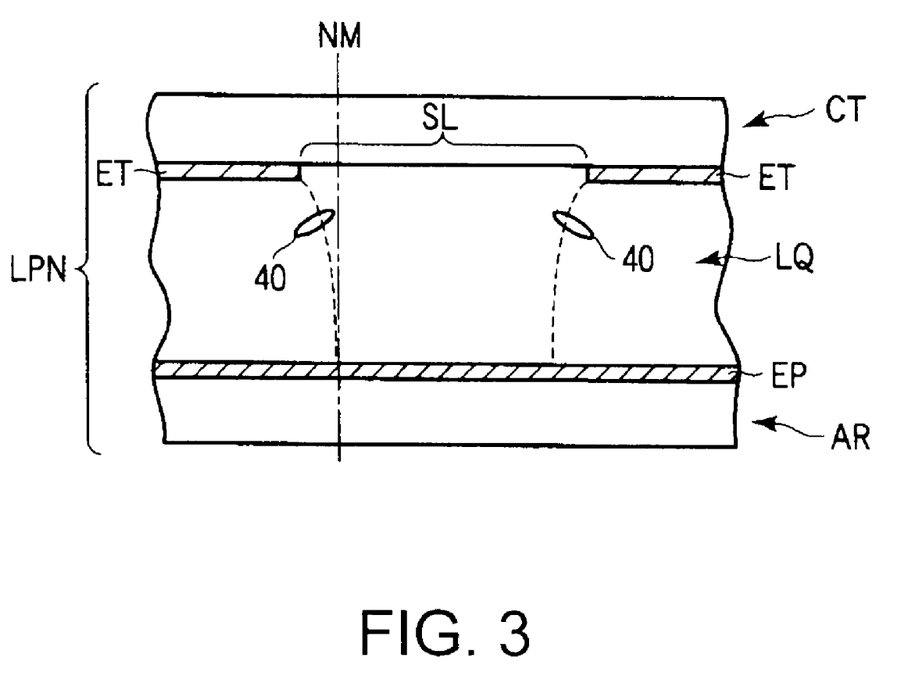
FIG. 3 is a cross-sectional view showing an implementation of alignment control for MVA mode according to the embodiment of the invention.

In an embodiment of the invention, the liquid crystal display device adopts a multi domain structure in which a view angle can be compensated. In more detail, the liquid crystal display device includes an alignment control device to control the alignment of the liquid crystal molecules 40 under a condition in which an electric field is applied between the picture electrode EP and the counter electrode ET. Slits are formed in the counter electrode ET as an alignment control device. The slits are formed by partially removing the counter electrode ET.

In the liquid crystal display device having above slits as alignment control device, an electrical field between the picture electrode EP and the counter electrode ET is formed so as to maintain the slits off. Therefore, it becomes possible to form a tilted electrical field with respect to a normal line of the surface of the substrates around the slits between the picture electrode EP and a counter electrode ET. As a consequence, the liquid crystal molecules 40 are aligned around the slits to a predetermined direction by the tilted electrical field. That is, two types of electrical fields that are tilted in opposite directions are formed at areas adjacent the slits. The alignment condition is propagated in a direction away from the slit SLs, that is, in a direction where a slope of the electrical field is smaller. Therefore, the liquid crystal molecules 40 of each pixel are also aligned in opposite directions and it is possible to make a wide view angle by compensating the view angle. Further, it is also possible to make a contrast ratio high by adopting a normally black mode, which results in achieving a high quality display.

Figure 4:
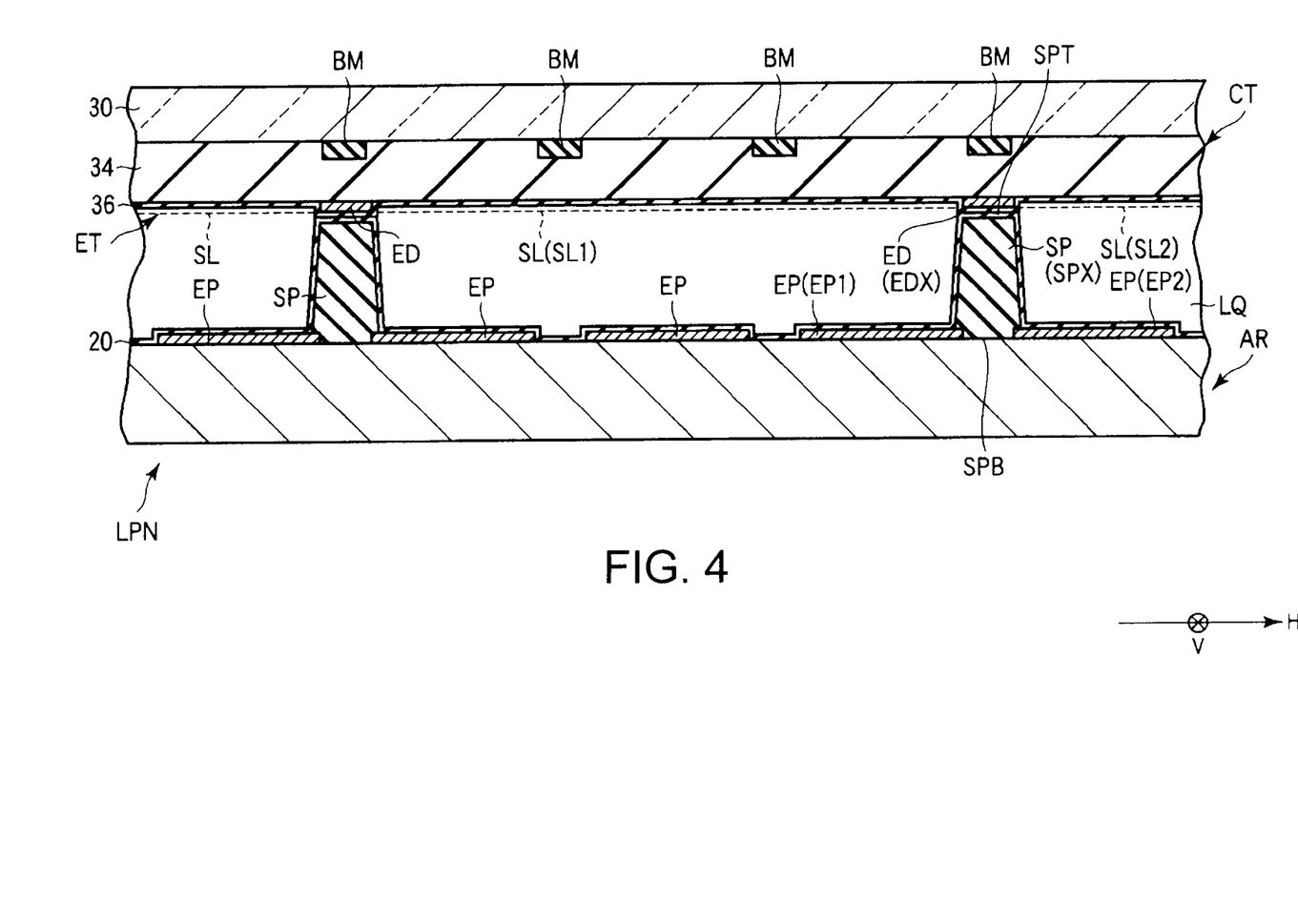
FIG. 4 is a cross-sectional view showing a liquid crystal display device according to the embodiment of the invention taken along a line III-III in FIG. 5.
Figure 5:
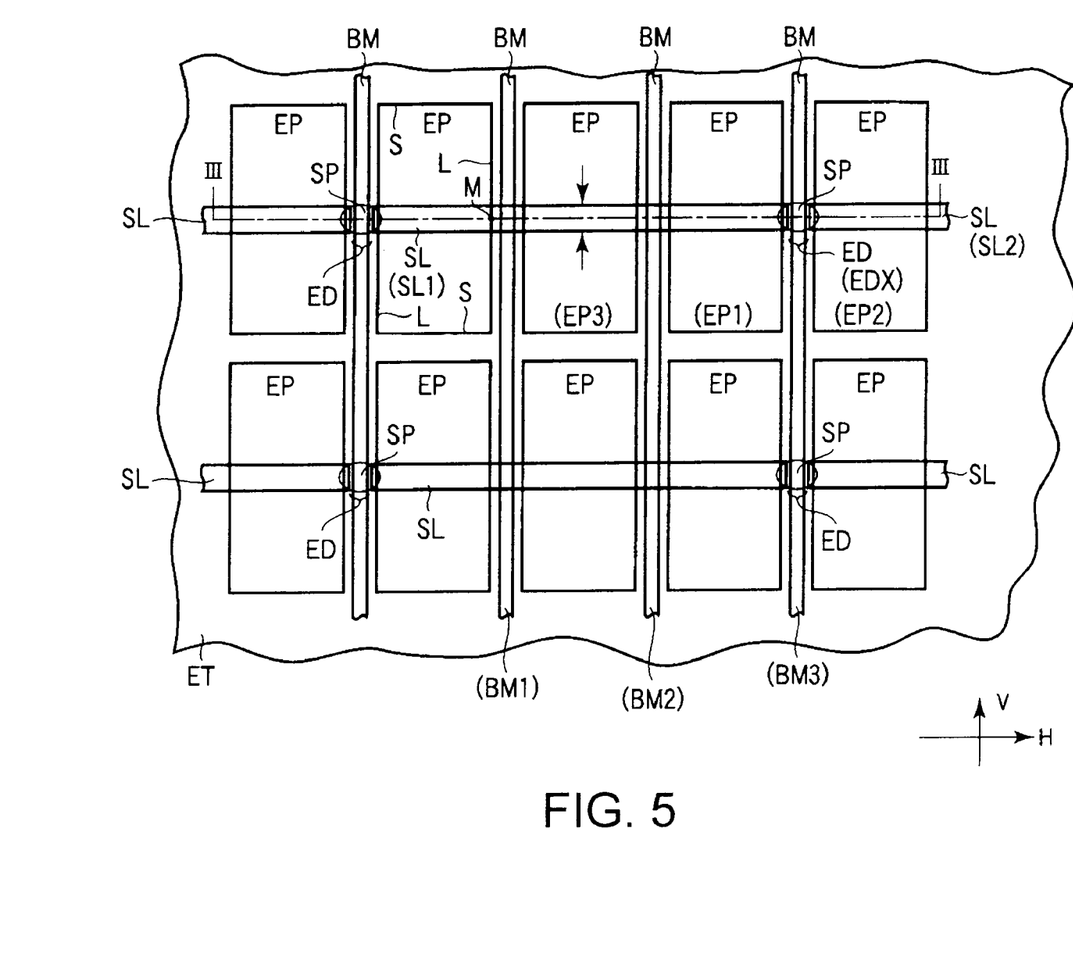
FIG. 5 is a plan view showing the liquid crystal display device shown in FIG. 4.

FIG. 4 is a cross sectional view showing a liquid crystal display device according to the embodiment of the invention taken along a line III-III in FIG. 5.

The array substrate AR includes columnar spacers SP to support the counter substrate CT. The columnar spacers SP are arranged between adjacent pixels in every three pixels in a row direction H. The columnar spacers SP are arranged at around middle portion of the longitudinal edge of the pixel electrode EP in a column direction V. In FIG. 4, if its attention is paid to a columnar spacer SPX, the columnar spacer SPX is arranged between a first pixel electrode EP1 and a second pixel electrode EP2. In this embodiment, a portion of bottom of the columnar spacer SPX is partially overlapped with the pixel electrodes EP1 and EP2, however, the bottom of the spacer SPX is not required to overlap with the pixel electrodes EP1 and EP2. The columnar spacers SP are not required to be arranged between every adjacent pixel electrodes EP. In this embodiment shown in FIG. 4, three pixel electrodes EP are arranged between the adjacent columnar spacers SP in the row direction H.

The columnar spacers SP are formed by patterning resign material. The columnar spacers SP are formed in a taper shape in which the area of the bottom portion SPB is larger than that of the top portion SPT of the columnar spacer SP. The surface of the pixel electrode EP and the columnar spacer SP is covered with the first alignment film 20. In the counter electrode ET, a slit line including a plurality of slits SL are formed so that each of the slits SL crosses the respective pixel electrodes EP at the center of the pixels PX. The slit line extends in the row direction H and is divided into a plurality of slits SL each having predetermined length. That is, the length of each of the slits SL is the same in the row direction H. Counter electrode portions ED of the counter electrode ET are arranged between the adjacent slits SL. The counter electrode portion ED is formed simultaneously with the counter electrode ET having the same thickness. The counter electrode portions ED are arranged on the regions between adjacent pixel electrodes EP. The top portion SPT of the columnar spacer SP opposes to the counter electrode portion ED.

In FIG. 4, for example, the columnar spacer SPX opposes to a counter electrode portion EDX between the first slit SL1 and the second slit SL2 The first slit SL1 and the second slit SL2 are formed so as to cross the first pixel electrode EP1 and the second slit SL2, respectively. The top portion SPT of the columnar spacer SPX may be partially overlapped with either one of the slits SL1 and SL2 or not overlapped with any of the slits SL1 and SL2, that is, opposes to only the counter electrode portion EDX. The surface of the counter electrode ET is covered with the second alignment film 36. The first alignment film 20 and the second alignment film 36 are interposed between the columnar spacers SPX and the counter electrode portion EDX so that the columnar spacer SPX does not directly contact the counter electrode portion EDX. The liquid crystal display layer LQ is held between a cell gap formed by the columnar spacer SPX.

According to above structure, a cell gap is designed so that the columnar spacer SP opposes to the counter electrode portion ED of the counter substrate ET. However, even if the array substrate AR and the counter substrate CT are out of alignment when attaching, a predetermined cell gap is formed because at least a portion of the columnar spacer SP opposes to the counter electrode portion ED. Therefore, it is possible to suppress the variation in the cell gap, further, to suppress an alignment defect of liquid crystal molecule due to the variation in the cell gap, which also results in suppression of a display defect.

As shown in FIG. 5, the slits SL formed in the counter electrode ET extend in the row direction H in which the adjacent pixel electrodes EP are arranged. In the counter electrode ET, the first slit SL1, the second slit SL2 and the counter electrode portion EDX between the first slit SL1 and the second slit SL2 are arranged in one line in the row direction H. The columnar spacers SP opposing to the counter electrode portion EDX, the first slit SL1 and the second slit SL2 are also arranged in the same line in the row direction. Similarly, other counter electrode portions ED opposing to the columnar spacers SP are arranged in the same line in which the adjacent slits SL are arranged so as to sandwich the counter electrode portions ED, respectively. For this reason, even if the array substrate AR and the counter substrate CT are out of alignment in the row direction H when attaching, a predetermined cell gap is formed because at least a portion of the columnar spacer SP opposes to the counter electrode portion ED. Moreover, the counter electrode portions ED extend to the counter electrode ET. Therefore, even if the array substrate AR and the counter substrate CT are out of alignment in the column direction V when attaching, a predetermined cell gap is formed because at least a portion of the columnar spacer SP opposes to the counter electrode ET.

Figure 6:
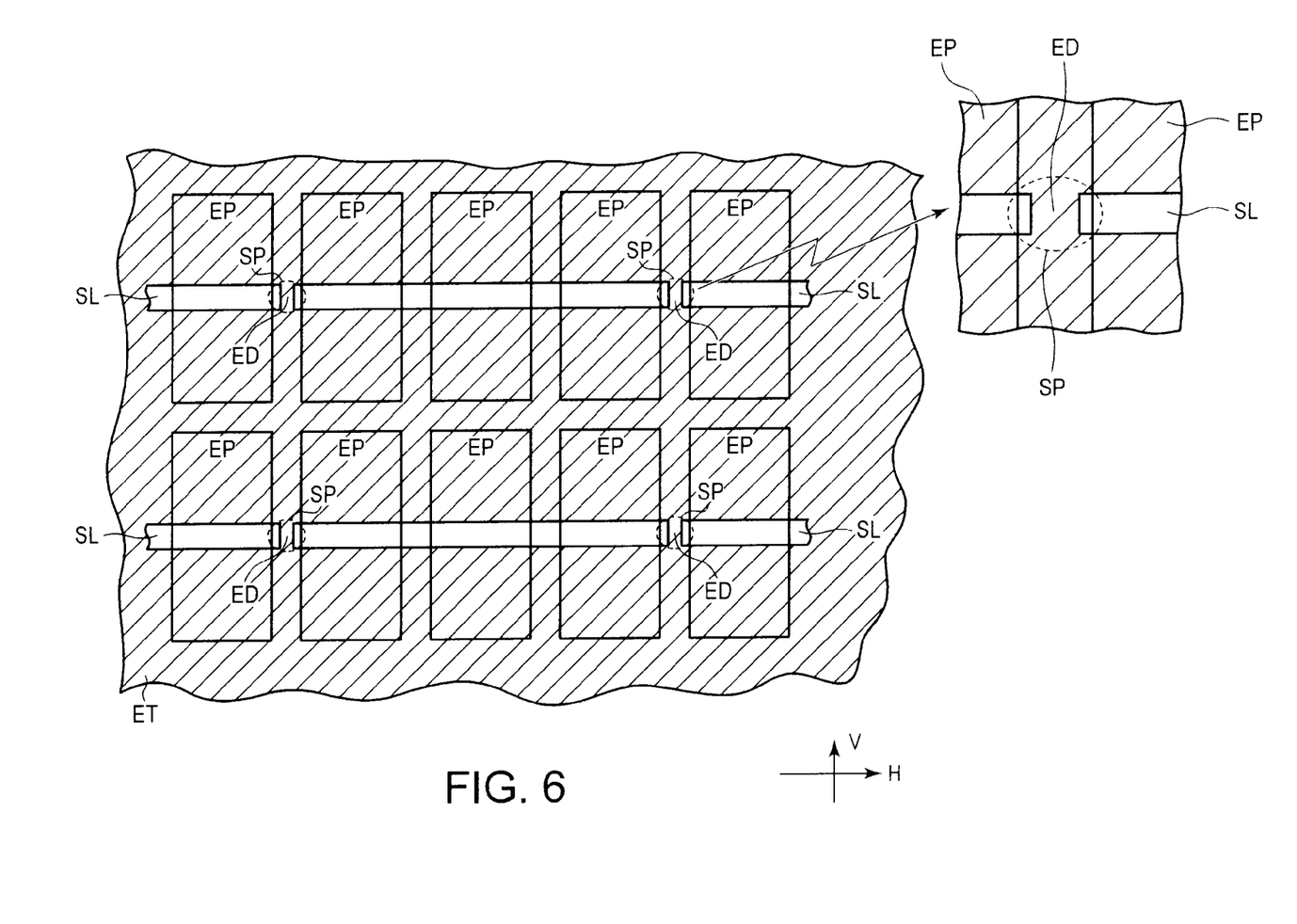
FIG. 6 is a plan view showing a structure of a counter electrode of the liquid crystal display device shown in FIG. 5.

FIG. 6 is a plan view showing a structure of the counter electrode of the liquid crystal display device shown in FIG. 5. Although the slits SL are formed crossing the pixel electrodes EP, the counter electrode ET is not electrically divided by the slits SL. The counter electrode ET arranged at both sides of the slits SL line in a line is connected via the counter electrode portions ED arranged between the adjacent slits SL formed in an island shape. That is, the entire counter electrode ET opposes to a plurality of pixel electrodes EP without being divided. Therefore, even if a crack generates in the counter electrode ET, an electrical connection for entire counter electrode ET is secured and a display defect such as a line defect is suppressed.

As shown in FIG. 5, the respective pixel electrodes EP are formed in a rectangular shape having a pair of a short edges S extending in the row direction H and a pair of longitudinal edges L extending in the column direction V. In the counter electrode ET, the first slit SL1, the second slit SL2 and the counter electrode portion EDX between the first and second slits SL1 and SL2 are arranged in a line crossing a mid point of the longitudinal edge L of the pixel electrodes EP1 and EP2 in the row direction H. That is, the columnar spacer SPX opposing to the counter electrode portion EDX is also arranged in a line crossing a mid point of the longitudinal edge L of the pixel electrodes EP1 and EP2 in the row direction H. Similarly, in other columnar spacers SL, the counter electrode portions ED, the slits SL formed so as to sandwich the counter electrode portions ED and columnar spacers SP are also arranged in a line crossing the mid point of the longitudinal edge of the pixel electrodes EP.

The pixel electrode EP is separated into two portions by the slit SL. Therefore, when an electrical field is applied between the pixel electrode EP and the counter electrode ET, the liquid crystal molecules are aligned in opposite directions toward the slit SL as shown by an arrow in FIG. 5. Therefore, a viewing angle is compensated. Furthermore, even misalignment occurs between the array substrate AR and the counter substrate CT, the columnar spacer SP is located in a center portion of the slit. Accordingly, the columnar spacer may not give a bad influence to the electrical field applied between the pixel electrode EP and the counter electrode ET easily. Since, the columnar spacer SP does not become a core which aligns the liquid crystal molecules in an undesired direction, it is possible to maintain the liquid crystal molecules in the desirable alignment condition. Accordingly, a stable alignment condition as shown by the arrow in FIG. 5 is obtained and, a lower of an aperture ratio substantially contributing the display quality is also suppressed.

The black matrix BM is arranged on the counter substrate CT so as to oppose to the regions between the adjacent pixel electrodes EP as shown in FIG. 4. The counter electrode portions ED of the counter electrode ET oppose to the black matrix BM interposing the color filter layer 34. The black matrix BM extends in the column direction V as shown in FIG. 5. Some of the black matrix BM oppose to the counter electrode portions ED and other black matrix BM cross the slits SL. The black matrix BM1 and BM2 arranged adjacent in the row direction H cross the slit SL1. The black matrix BM3 crosses the counter electrode portions ED. The columnar spacer SP opposing to the counter electrode portion ED is also arranged so as to oppose to the black matrix BM3 which does not substantially contribute the display.

Next, a process for manufacturing the liquid crystal display device will be explained. In this embodiment, a seal element SE is arranged on either one of the array substrate AR and the counter substrate CT in a loop shape. A predetermined amount of liquid crystal material is dropped in an area surrounded by the seal element SE using one drop fill (ODF) method. After the array substrate AR and the counter substrate CT are attached in the state of vacuum, the attached liquid crystal display panel is returned to the atmospheric pressure state from the vacuum state. By the pressure difference between the inside seal element SE and the open air, the seal element SE is pressed. Consequently, the liquid crystal layer LQ is held in the predetermined cell gap between the array substrate AR and the counter substrate CT. According to the one drop fill method, advantages such as shorten of tact time or use efficiency of the liquid crystal material may be obtained.

In the case where one drop fill method is used to hold the liquid crystal layer LQ between the array substrate AR and the counter substrate CT, capacity between the array substrate AR and the counter substrate CT is decided in advance and the amount of the liquid crystal material to be dropped is also decided in advance corresponding to the capacity between the substrates. Accordingly, the variation in the cell gap may result in excess and deficiency of the liquid crystal material and high gap accuracy is required in the one drop fill method. According to this embodiment, since the variation in the cell gap is suppressed, it is possible to inject the liquid crystal material without the excess and the deficiency in the dropping injecting method. Consequently, the original advantage by using the one drop fill method. is obtained without being diminished.

EXAMPLE

In the array substrate AR, the pixel electrodes EP are arranged having a pitch of 27.5 μm between the pixel electrodes PE. A plurality of columnar spacers SP are arranged between the adjacent pixel electrodes EP. In the counter substrate CT, the slits SL in the counter electrode ET having 15 μm width to control the alignment of the liquid crystal molecules are formed. The counter electrode portions ED having 11.5 μm width are formed between the adjacent slits SL arranged in a line. The array substrate AR and the counter substrate CT are attached by the seal element SE in which the columnar spacers SP oppose to the counter electrode portions ED.

Consequently, even if the accuracy to attach the array substrate AR and the counter substrate CT is worse, the variation in the cell gap due to the misalignment of the columnar spacers SP is suppressed. The defect display due to the variation in the cell gap is also suppressed. Since one slit line extending in the row direction H is divided into the plurality of slits SL having a predetermined length, a disconnection of the counter electrode CT due to crack of the counter electrode ET is prevented, and further the defective display is also suppressed.

As mentioned above, according to this embodiment, a vertical align mode liquid crystal display device capable of suppressing the variation in the cell gap and achieving a wide view angle can be provided.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understood that within the scope of the appended claims, the present invention may be practiced other than as specifically disclosed herein.

What is claimed is:

1. A liquid crystal display device comprising:
an array substrate having first and second pixel electrodes arranged adjacent each other;
a counter substrate having a counter electrode opposing to the first and second pixel electrodes;
a first slit formed in the counter electrode opposing to the first pixel electrode so as to cross the first pixel electrode;
a second slit formed in the counter electrode opposing to the second pixel so as to cross the second pixel electrode, the second slit being arranged in line with the first slit, and the counter electrode being separated into a first counter electrode portion and a second counter electrode portion by the lined first and second slits;
a connecting counter electrode portion arranged between the first and second slits to connect the first and second counter electrode portions;
a columnar spacer arranged between the first and second slits opposing to the connecting counter electrode portion to form a cell gap between the array substrate and the counter substrate; and
a liquid crystal layer formed in the cell gap.

2. The liquid crystal display device according to claim 1, wherein the first and second slits extend in a first direction in which the first and second pixel electrodes are arranged adjacent each other.

3. The liquid crystal display device according to claim 2, wherein the columnar spacer, the first and second slits are arranged in the first direction.

4. The liquid crystal display device according to claim 2, wherein the first and second pixel electrodes are formed in a rectangular shape having a pair of longitudinal edges and a pair of short edges, and the columnar spacer and the first and second slits are arranged in a line along the first direction in which the line intersects with a mid point of the longitudinal edge of the pixel electrode.

5. The liquid crystal display device according to claim 2, wherein a shielding layer is formed on the counter substrate opposing to the connecting counter electrode portion and extending in a second direction orthogonally intersecting with the first direction.

* * * * *